US009644871B2

(12) United States Patent
Wyttenbach et al.

(10) Patent No.: US 9,644,871 B2
(45) Date of Patent: May 9, 2017

(54) ABSORBER WITH A SPIRAL PLATE EXCHANGER WITH A HOMOGENEOUS FLUID SUPPLY (71) Applicant: COMMISSARIAT A L'ENERGIE ATOMIQUE ET AUX ENERGIES ALTERNATIVES, Paris (FR)

(72) Inventors: Joël Wyttenbach, Curienne (FR); François Boudehenn, Saint Sauveur de Montagut (FR); Hélène Demasles, La Motte-Servolex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 304 days.

(21) Appl. No.: 14/415,855

(22) PCT Filed: Jul. 11, 2013

(86) PCT No.: PCT/EP2013/064649
§ 371 (c)(1),
(2) Date: Jan. 20, 2015

(87) PCT Pub. No.: WO2014/016128
PCT Pub. Date: Jan. 30, 2014

(65) Prior Publication Data
US 2015/0176874 A1 Jun. 25, 2015

(30) Foreign Application Priority Data

Jul. 23, 2012 (FR) ...................... 12 57096

(51) Int. Cl.
*F25B 27/00* (2006.01)
*F25B 37/00* (2006.01)
(Continued)

(52) U.S. Cl.
CPC ............ *F25B 27/007* (2013.01); *F25B 15/02* (2013.01); *F25B 37/00* (2013.01); *F25B 41/00* (2013.01);
(Continued)

(58) Field of Classification Search
CPC ........ F25B 27/007; F25B 15/02; F25B 41/00; F25B 37/00; F28F 9/0273; F28F 9/026; F28D 9/04; Y02B 30/62
See application file for complete search history.

(56) References Cited

U.S. PATENT DOCUMENTS

| 2,663,549 A | 12/1953 | Otten |
| 6,089,312 A | 7/2000 | Biar et al. |
| 6,253,571 B1 | 7/2001 | Fujii et al. |

FOREIGN PATENT DOCUMENTS

| CN | 1153277 A | 7/1997 |
| DE | 10 2010 041 289 A1 | 3/2011 |

(Continued)

OTHER PUBLICATIONS

International Search Report dated Jan. 17, 2014, issued in corresponding application No. PCT/EP2013/064649.

*Primary Examiner* — Emmanuel Duke
(74) *Attorney, Agent, or Firm* — Westerman, Hattori, Daniels & Adrian, LLP (57) ABSTRACT A system comprises on the one hand a spiral plate exchanger coiled around a principal axis of the exchanger, in particular oriented vertically, so as to delimit a first fluid flow channel having a cross section in the shape of a spiral discharging at a first axial extremity of the exchanger at an inlet zone of which the overall size is contained within a crown, and on the other hand a distribution device configured in order to
(Continued)

supply in a homogeneous manner the whole of the surface of the said crown with at least a first fluid, in particular a liquid.

35 Claims, 3 Drawing Sheets

(51) Int. Cl.
  *F28F 9/02* (2006.01)
  *F28D 9/04* (2006.01)
  *F25B 15/02* (2006.01)
  *F25B 41/00* (2006.01)

(52) U.S. Cl.
  CPC ............... *F28D 9/04* (2013.01); *F28F 9/026* (2013.01); *F28F 9/0273* (2013.01); *Y02B 30/62* (2013.01)

(56) References Cited

FOREIGN PATENT DOCUMENTS

| | | | |
|---|---|---|---|
| JP | 60-232495 | A | 11/1985 |
| JP | 8-166194 | A | 6/1996 |
| JP | 10-26486 | A | 1/1998 |
| JP | 10-332225 | A | 12/1998 |
| JP | 2006-162154 | A | 6/2006 |
| KR | 2001-0065569 | A | 7/2001 |
| WO | 98/12487 | A1 | 3/1998 |
| WO | 98/41798 | A1 | 9/1998 |
| WO | 99/62318 | A2 | 12/1999 |

ABSORBER WITH A SPIRAL PLATE EXCHANGER WITH A HOMOGENEOUS FLUID SUPPLY

TECHNICAL FIELD OF THE INVENTION

The invention relates in a general manner to the manner of supplying the inlet to a plate exchanger with one or more fluid(s). The invention has as its object more specifically a system comprising a spiral plate exchanger having a first fluid flow channel in the shape of a spiral to be supplied with at least a first fluid.

The invention also has as its object a thermodynamic machine comprising at least one such system, in particular an absorption refrigeration machine in which the system is constituted by an absorber providing the absorption, by the first fluid, of a second fluid such as a refrigerant fluid.

STATE OF THE ART

The current steep increase in the need for air conditioning during the summer period represents a very important development potential for the solar cooling market. These systems mostly use absorption machines.

With the advent, some years ago, of low-power absorption machines on the one hand and the desire for compact and complete solutions on the other hand, the market should be set to experience strong future development. However, one of the limitations to this development is the necessarily very high initial investment cost. For this reason, a major development of low-power machines must be undertaken in order to bring down the associated costs. It is necessary, therefore, to address the above-mentioned budgetary and industrialization problems at the same time as the methods discussed below. The essential technical problems concern in particular the component part of the machine known as the "absorber".

In an absorption refrigeration machine, the traditional compressor is replaced by the astute and combined management of first and second fluids, being respectively absorbent and refrigerant, with a transfer of mass by absorption from the second fluid to the first fluid. The second fluid, having the function of a refrigerant, arrives at the absorber in the gaseous state or almost totally gaseous state. The absorber of the machine is one of the essential elements, likewise being the most specific compared to the traditional methods of refrigeration by mechanical compression. The equilibrium between the phases concerned is complex in this case. Whereas a traditional refrigeration system is based on the driving force of a compressor, absorption machines utilise the pairing formed by the first and second fluids. The first fluid permits the refrigerant to be transported in liquid form from low pressure to high pressure. The mixture is then heated in order to separate the two fluids and in this way to provide a driving force for the refrigerant circuit. After having passed through the traditional refrigeration circuit, the second refrigerant fluid must once again be absorbed by the first absorbent fluid before returning to the heating apparatus. This absorption phenomenon is specific and difficult to understand because it combines a flow with a transfer of mass, a change of phase and a thermal exchange, all of these phenomena being interlinked with regard to the travelling speeds.

One familiar method is to design an absorber comprising a exchanger with parallel plane plates, where appropriate inclined in relation to the vertical, or a exchanger with tubes housed between an internal cylindrical vessel and/or an external cylindrical vessel. These exchangers possess the advantage of being configured so as to form, in at least one fluid flow channel, a flowing film of a first fluid, while the second fluid circulates with or against the flow along the flowing film in the same fluid flow channel.

Documents JP2006162154, KR20010065569, JP10332225, WO9841798 and CN1153277 disclose solutions of this kind, although these are not satisfactory in terms of robustness and reliability, industrialization and cost. In particular, the distribution of the fluids in the channels is unsatisfactory in terms of homogeneity, compactness, quantity of fluid and reliability (in particular being subject to contamination in the case of distribution through localized holes).

Although these problems relate primarily to the case of absorption refrigeration machines, they may equally affect thermodynamic machines of different kinds with the double distribution of gas and liquid in common channels, or even to the case of washing towers. They may also arise in the case of a mono-fluid distribution. The main problem is ultimately, at lower cost and in a reliable, robust and easily industrialized manner, to distribute at least the first fluid in the most homogeneous possible manner in the channels of a exchanger, in the non-exclusive but principal context of absorption between fluids.

Documents WO09962318, JP60232495, DE102010041289 and WO9812487 relating to exchangers intended for the formation of a flowing film with at least a first fluid in an application that is not concerned with the area of absorption, also fail to address these problems and continue to be complicated because of a distribution at multiple points (utilization of localized holes) and/or at multiple stages of distribution.

OBJECT OF THE INVENTION

The aim of the present invention is to propose a system which simultaneously rectifies all of the disadvantages listed above.

In particular, one object of the invention is to make available a system permitting the distribution in the most homogeneous manner possible of at least the first fluid in a exchanger in a reliable and robust, cost-effective and easily industrialized manner.

These objects may be accomplished by all or some of the accompanying claims, in particular by a system comprising on the one hand a spiral plate exchanger coiled around a principal axis of the exchanger, in particular being oriented vertically, so as to delimit a first fluid flow channel having a cross section in the form of a spiral discharging at a first axial extremity of the exchanger at an inlet zone of which the overall size is contained within a crown, and on the other hand a distribution device configured in order to supply the whole of the surface of the said crown in a homogeneous manner with at least a first fluid, in particular a liquid, the distribution device comprising a spray nozzle for the first fluid configured so as to form at its outlet a jet of the first fluid of conical shape, being hollow at the centre of the cone, oriented in the principal axis of the exchanger, and such that the jet exhibits, at the inlet zone of the first fluid flow channel, the shape of a crown having dimensions equal to the dimensions of the crown of the inlet zone.

These objects may also be accomplished by a system comprising, on the one hand, a spiral plate exchanger coiled around a principal axis of the exchanger, in particular being oriented vertically, so as to delimit a first fluid flow channel having a cross section in the form of a spiral discharging at a first axial extremity of the exchanger at an inlet zone of which the overall size is contained within a crown, and, on the other hand, a distribution device configured in order to supply the whole of the surface of the said crown in a homogeneous manner with at least a first fluid, in particular a liquid, the distribution device comprising an outlet in the area of which the first fluid is ejected uniformly from the distribution device and is arranged at a distance from the inlet zone in the principal axis of the exchanger, and the outlet of the distribution device being constituted by a distribution element configured so as to be passed through by the first fluid with a pressure drop such that the first fluid is ejected from the distribution element with a uniform surface distribution at an outlet surface of the distribution element, in a manner ensuring the homogeneous supply of the inlet zone with a first fluid.

A thermodynamic machine may preferably comprise at least one such system.

Provision may be made, on the other hand, for the utilization of such a system in which the first and second fluids are configured such that the second fluid is at least partially absorbed by the first fluid during the flow in the said at least one first fluid flow channel, in order to constitute an absorber of a thermodynamic machine for refrigeration by solar absorption.

BRIEF DESCRIPTION OF THE DRAWINGS

Other advantages and characterizing features will be appreciated more clearly from the following description of particular embodiments of the invention that are provided by way of non-restrictive examples and are illustrated in the accompanying drawings, in which.

DESCRIPTION OF PREFERRED MODES FOR CARRYING OUT THE INVENTION

The rest of the description, with reference to FIGS. 1 to 6, relates to a thermodynamic machine equipped with different embodiments of a system which is the objet of the invention.

The absorption by a first fluid F1 of a second fluid F2 permits a gas (fluid F2) to be absorbed by a liquid solution (fluid F1). In the context of absorption refrigeration machines, this reaction is exothermic and sensitive to temperature: heating has a tendency to slow down the speed of the absorption reaction until a total stop occurs if the thermodynamic equilibrium temperature is reached. Moreover, the temperature equilibrium decreases in line with the absorption. The intention is thus to cool the absorbent solution (fluid F1) in line with the advancement of the absorption reaction of the fluid F2. Use can preferably also be made of a third fluid F3 intended to perform a cooling function. In addition, the absorption reaction must also be as complete as possible because, at the end of the absorption, the resulting solution may be conveyed towards a hydraulic pump of the thermodynamic machine, of which the operation is susceptible to being damaged by the residual presence of gas.

As stated above, the principle of forming a flowing film with the first fluid F1 in the context of an absorption reaction is commonly utilized by means of exchangers with tubes and vessels, with entirely satisfactory results in the area of the absorption reaction and the thermal exchange with the third fluid. The aim is thus to reproduce these favourable operating conditions while addressing the problems mentioned earlier.

For this purpose, according to one important characterizing feature, the system 10 comprises on the one hand a exchanger 11 with a spiral plate 12 coiled around a principal axis X of the exchanger 11 so as to delimit a first fluid flow channel 13 in the form of a spiral discharging at a first axial extremity 14 of the exchanger 11 at an inlet zone 15 of the channel 13, of which the overall size is contained within a crown, that is to say generally annular and empty in a central zone. The exchanger 11 is in particular oriented such that its principal axis X is vertical or substantially vertical. This is a crown centred on the axis X and included in a plane perpendicular to the axis X.

According to an important additional characterizing feature, the system comprises on the other hand a distribution device 16, which is further described below, configured in order to supply the whole of the surface of the crown in a homogeneous manner with at least a first fluid F1. Thus, the distribution device 16 makes it possible to spray at least the inlet of the channel 13 in the form of a spiral and the closed extremity of a second fluid flow channel for the possible flow of a third fluid F3.

The advantages of a exchanger with spiral plates, in particular with respect to a exchanger with tubes and vessels, are essentially the following:

permits the production at low cost of an absorber, of which the industrialization has already largely been completed, a steep reduction in the necessary quantities of fluids, a large reduction in the bulk of the solution, lower sensitivity to orientation (verticality) depending on the nature of the distribution, optimization of the flow and the transfers of mass and heat, improved robustness in terms of fluid distribution, with better homogeneity, as further described below, improved tolerance to contamination of the distribution thanks to the advantageous arrangement of multiple possible baffles, as further described below.

On the other hand, the advantages with respect to an absorber based on a exchanger with plane plates are essentially the following:

the available space gives more freedom for the design of the distributor, a dimensional ratio which is highly favourable for the establishment of a flowing film: industrial exchangers 11 with spiral plates may have a better ratio between their height and the proposed surface than exchangers with plane plates, improved distribution of the flowing film, in particular in the upper part of the spiral plates 12.

In a known manner, an industrial exchanger 11 with a spiral plate 12 exhibits a cylindrical shape, in particular generally of circular cross section perpendicular to the principal axis X. The height of the exchanger 11 measured in the axis X may be divided into three parts: a central part occupied by the spiral plate 12 and two extreme parts for the arrangement of first and second fluid supply housings. For exchangers 11 with a spiral plate 12 functioning with cross flows, which is the case here, the third cooling fluid F3 is introduced at the centre of the spiral, in an internal vessel 17. The third fluid F3 then progresses in a second fluid flow channel, of spiral shape, distinct from the first fluid flow channel 13. The second channel is delimited by the plate 12 for half the height of the central part of the exchanger 11 about the principal axis X until the spiral reaches the point of external contact of the cylinder in the area of an external vessel 18. At least one plate 12 is thus housed between the vessels 17 and 18. The fluid F3 then passes through a median wall perpendicular to the axis X at the mid-height of the central part of the exchanger, in the direction of the second half height of the central part, in order to follow a spiral course from the external vessel 18 and as far as the internal vessel 17. The pitch of the spiral adopted by the fluid F3 along the second fluid flow channel and the thickness of this channel are dimensioned by embossing of such a kind that the turns or coils are not contiguous, advantageously leaving a gap forming the first fluid flow channel 13 for the first fluid F1, or likewise for the second fluid F2 for the absorption applications. This first channel 13 has a spiral section in a plane perpendicular to the principal axis X of the cylinder. Unlike the second channel dedicated to the fluid flow of the third fluid F3, the first channel 13 is open at the first 14 and second (not illustrated) axial extremities of the exchanger 11 respectively on upper 19 and lower (not illustrated) fluid supply housings. The first channel 13 intended for the fluid flow of the fluids F1 and possibly F2 does not communicate with the internal vessel 17, and it is passed through by a fluid flow parallel to the principal axis X. The direction of flow of the third fluid F3 has a flow that is crossed by that of the first and second fluids F1, F2.

Advantageously, the distribution device 16 comprises an outlet (in the area of which the first fluid F1 exits uniformly from the distribution device 16) arranged at a distance D1 from the inlet zone 15 in the principal axis X of the exchanger 11.

Figure 1:
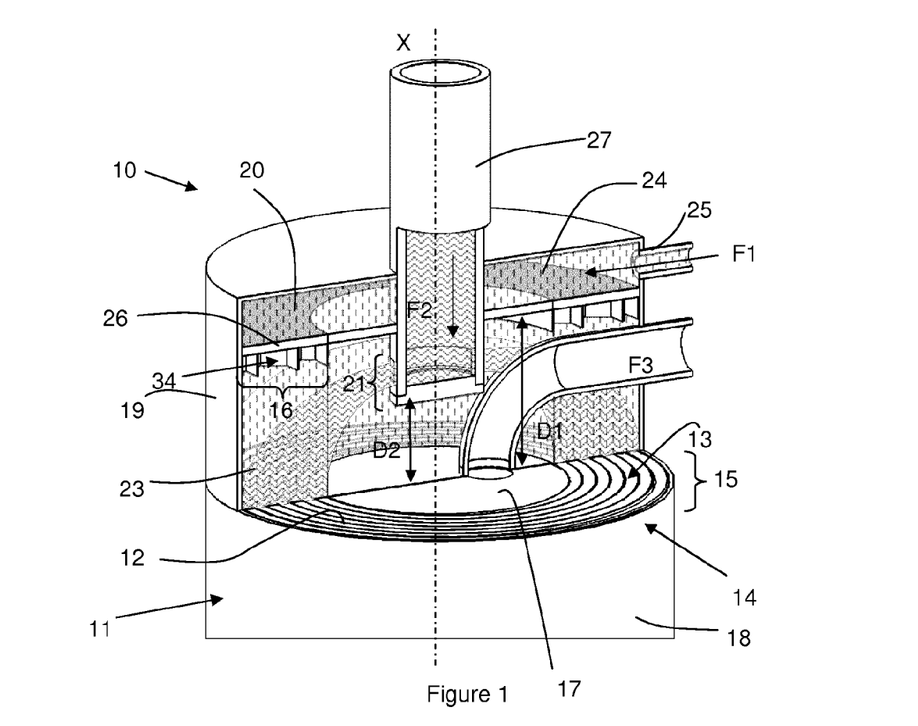
FIG. 1 is a perspective view, in partial cross section, of an example of a system according to the invention.

In a first embodiment with reference to FIG. 1, the outlet of the distribution device 16 is constituted by a distribution element 20 configured so as to be passed through by the first fluid F1 causing it to experience a pressure drop such that the first fluid F1 exits from the distribution element 20 with a uniform surface distribution at an outlet surface of the distribution element 20, in a manner ensuring the homogeneous supply of the first fluid F1 over the whole of the surface of its crown. The outlet surface of the distribution element 20 is constituted by the face of the distribution element 20 next to the crown in the axis X and is situated at the distance D1 from the latter.

The pressure drop is a global parameter of the distribution element 20 of which the construction may vary considerably. The intention here is to create a sufficient pressure drop in order to be significantly higher (by a factor of 10, for example) than the pressure differential created in the upstream zone (because of the effect of deceleration of the flow and the viscous drag) between the inlet 25 and the upstream surface of the element 20. This pressure drop must not exceed 1 bar within the context of solar refrigeration.

The acceptable and sufficient pressure drop likewise depends on several geometric and flow-related parameters, and it may typically be between 3 and 250 mbar.

Preferably, the distribution element 20 comprises passage openings passing through the entire thickness of the distribution element 20 and discharging onto the outlet surface of the element 20, these passage openings advantageously being tortuous or having baffles from the inlet surface towards the outlet surface.

In a first embodiment, the distribution element 20 comprises a structure, in particular a self-supporting structure, of sintered material formed by an agglomeration of balls. This structure is in particular configured so as to have no preferred direction of flow of the first fluid F1 and so as to exhibit a coefficient of flow of the first fluid F1 depending on the fineness of the sintered material. In the context of a sintered material, this pressure drop can be obtained avec a material of a class typically between 3 and 60 µm for a thickness of 1 to 10 mm.

Generally, the size of the gaps in a suitable sintered material for this application is between 20 and 500 µm. The size of the gaps is not necessarily equal to that of the sintered grains.

In a second embodiment (not illustrated), the distribution element 20 comprises a stack of metallic screen cloth superposed in the principal axis X of the exchanger 11.

These two embodiments share the following advantages:
an integral construction in a stainless material is possible with welded assemblies. This makes it possible to work with pairings of corrosive fluids F1 and F2 respectively such as the ammonia/water pairing, for example.
the porous material passes at regular intervals. For this reason, its positioning is simple, making the system more robust.
the porous materials are industrial products that are already utilized for other applications (catalysis, vinification and filtration . . . ).
the multitudes of possible routes in baffles for the flow of the first fluid F1 induce a high tolerance to obstructions due to impurities, since numerous possible adjacent routes are available in the case of an obstruction. Furthermore, the fact that the sintered material has an irregular surface severely limits the effect of sealing provided by the impurities. The resistance of the solution to contamination is accordingly very good.

According to the prior art presented in document CN1153277, a known method consisted of creating a finite but large number of holes or passages permitting the liquid to be ejected from the flow channeling for the first liquid fluid, for example by the provision of a perforated tube on a portion of its surface. The difficulties associated with this method derive from the delicate compromise between the need to provide holes having the smallest possible diameters in order to obtain good distribution of the first fluid, having regard for the harmful problems of contamination and clogging in view of the discrete number of holes: the smaller the holes, the more readily they are obstructed. The increase in the number of holes is associated with the reduction in their diameter, making their realization very complicated. The method proposed in the present invention, on the other hand, involves the utilization of an industrial material of which the pressure drop is sufficiently high to ensure the advantageous surface homogeneity of the distribution. This type of material has the effect of creating a large number of baffles in the route of the first fluid F1, the effect of which is to provide a very large number of possible routes. The possible blockage of a portion of the outlet surface thus brings about only a very local deviation in the flow, which then follows an adjacent route, which permits the exiting flow never to exhibit any marked discontinuity, contrary to the prior art described above where such risks exist. The manufacture of such materials is mastered at an industrial level, which is also an important criterion for the choice of technology. The variable fineness of the sintered structures permits the adjustment of the coefficient of flow with a constant external geometry. The losses of pressure may be particularly high for a small thickness, which permits a reduction in the overall size of the distribution device 16 with respect to the prior art while maintaining very good homogeneity of the distribution of the first fluid F1.

Figure 4:
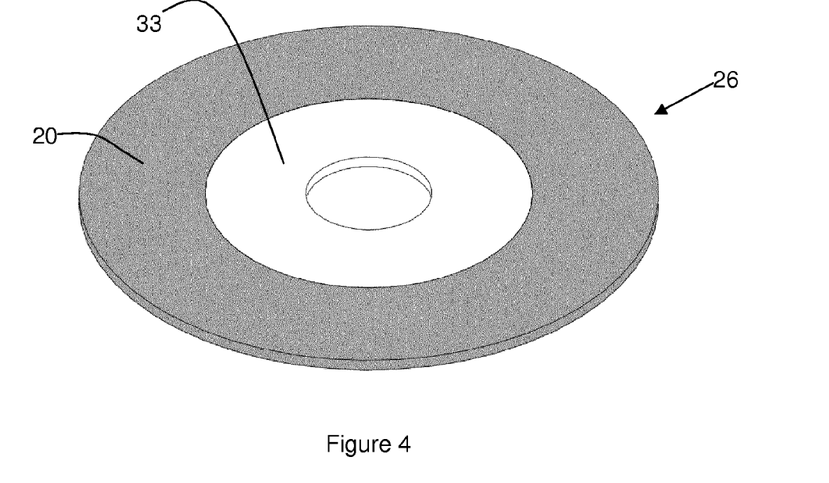
FIG. 4 is a perspective view of a first embodiment of a device for the distribution of a first fluid.
Figure 5:
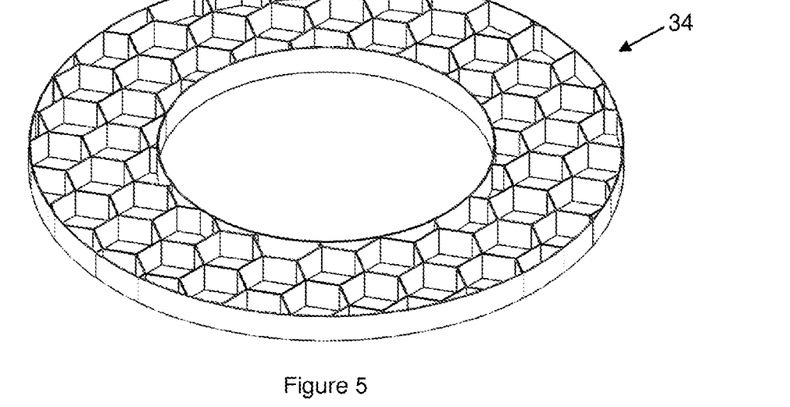
FIG. 5 shows in perspective an embodiment of an anti-coalescence device.

With reference to FIG. 4, the outlet surface of the distribution element 20 exhibits the shape of a crown aligned in the principal axis X of the exchanger 11 with the shape of the crown of the inlet zone 15. The crown formed by the distribution element 20 exhibits in particular dimensions equal to the dimensions of the crown delimited by the inlet zone 15.

Figure 6:
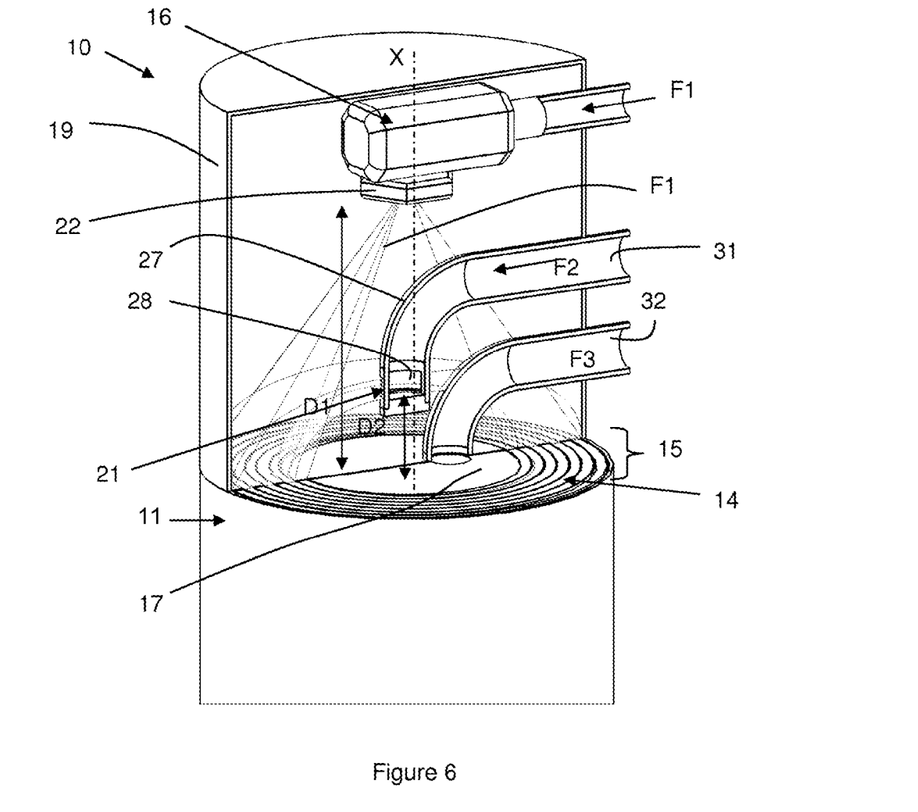
FIG. 6 is a perspective view, in partial cross section, of another example of a system according to the invention equipped with a second embodiment of a device for the distribution of a first fluid.

In a second embodiment with reference to FIG. 6, the distribution device 16 comprises a spray nozzle 22 for the first fluid F1 configured so as to form at its outlet (the outlet of the nozzle 22 being a constituent part of the outlet of the distribution device 16) a jet of the first fluid F1 of conical shape, hollow at the centre of the cone and oriented in the principal axis X of the exchanger 11. The jet is configured in particular, thanks to an appropriate design of the nozzle 22, so as to exhibit, at the inlet zone 15, the shape of a crown exhibiting dimensions equal to the dimensions of the crown of the inlet zone 15, viewed in a plane of section of the jet perpendicular to the axis X. The flow within the jet exhibits an annular cross section. In particular, a nozzle 22 of the spray type may be selected on the basis of the desired annular geometry of its outlet jet.

Advantageously, although not exclusively, this could be an absorption refrigeration machine in which the system constitutes an absorber intended to bring about the absorption by the first fluid F1 of a second fluid F2, such as a fluid refrigerant of the gas type, at least in the area of a part of the refrigerant circuit of the thermodynamic machine. It is for this reason, in addition to the distribution device 16 for the first fluid F1 supplying the first flow channel 13 in the most homogeneous possible manner between them, that the system may also include a supply device 21 arranged above the first axial extremity 14 of the exchanger 11 and be configured in order to supply the inlet zone 15 of the first fluid flow channel 13 with a second fluid F2, in particular a gas, in addition to the first fluid F1. The exchanger 11 with a spiral plate 12 and/or the distribution device 16 are advantageously configured, in this case, such that the first fluid F1 exiting from the distribution device 16 forms a film flowing along the first fluid flow channel 13.

The supply device 21 thus supplies the first flow channel 13 of the exchanger 11 with a spiral plate 12 with a second fluid F2 provided in order to circulate in the first spiral channel 13 together with the first fluid F1, in particular along the flowing film formed by the latter after its uniform exit from the distribution device 16. The distribution devices 16 for the first fluid F1 and the supply devices 21 for the second fluid D2 are in particular arranged so as to supply the first channel 13 at the supply zone 15 that is common to the first and second fluids F1, F2. The first channel 13 is configured in such a way that, inside the latter, the second fluid F2 circulates along the flowing film of first fluid F1 and is absorbed by the first fluid F1 with a transfer of mass from the second fluid F2 towards the first fluid F1.

Thus, the first fluid is preferably a liquid of an absorbent type, and the second fluid is a gas capable of being absorbed at least partially by the first fluid with a transfer of mass from the second fluid towards the first fluid. This second fluid may in particular be a refrigerant.

The supply device 21 advantageously comprises an outlet in the area of which the second fluid F2 is ejected from the supply device 21. This outlet is arranged at a distance D2 with respect to the inlet zone 15, in the principal axis X of the exchanger 11.

According to the illustrated embodiment, the outlet of the supply device 21 for the second fluid F2 is situated, in the principal X axis of the exchanger 11, between the inlet zone 15 and the distribution device 16 for the first fluid F1. In other words, the distance D2 is then smaller than the distance D1. Such a design makes it possible to arrive at a configuration in which a flow formed by the second fluid F2 ejected from the supply device 21 meets the first fluid F1 before reaching the inlet zone 15: the second fluid F2 ejected at the outlet of the supply device 21, after its ejection, meets a flow formed by the first fluid F1 previously ejected at the outlet of the distribution device 16. In the embodiment depicted in FIG. 6, however, the distance D2 may be greater than the distance D1. These meetings take place before the first fluid and/or the second fluid reaches the supply zone 15.

Advantageously, the outlet of the supply device 21 for the second fluid F2 is configured in such a way that the second fluid F2 is ejected in a perpendicular direction (or more generally a perpendicular plane) to the principal axis X of the exchanger 11. Then, in the illustrated variant, the flow of fluid F2 thus ejected has a tendency to flow towards the bottom, before meeting the flow formed by the previously ejected first fluid F1.

In one particular variant embodiment (FIG. 1) that is non-restrictive in terms of the conceivable design, the system comprises a first supply housing, in this case the first supply housing 19, extending the exchanger 11 axially at its first axial extremity 14. This first supply housing 19 comprises:
- a first chamber 23, in particular a lower chamber, and communicating with the inlet zone 15 of the first fluid flow channel 13,
- a second chamber 24, in particular an upper chamber, arranged axially on the side opposite the exchanger 11 with respect to the first chamber 23 and equipped with an inlet 25 for the first fluid F1 and configured so as to be filled (immersed in the case of a liquid) by the first fluid F1,
- a separating wall 26 between the first and second chambers 23, 24, the separating wall 26 being at least partially constituted by the distribution element 20 so as to ensure a uniform ejection of the first fluid F1 from the second chamber towards the first chamber, in particular with a regular distribution pattern in the form of a crown.

The distribution element 20, which passes at regular intervals, exhibits a pressure drop sufficient to permit a homogeneous distribution of the flow of the first liquid fluid, downstream of the latter. The fact that a quantity of a second gaseous fluid is introduced into the lower chamber 23 introduces a difference in the type of flow on the liquid at the distribution element 20. The upstream flow (in the chamber 24) is immersed, whereas downstream, it is biphasic with the presence of a flow of the liquid. Droplets of liquid are formed and fall by gravity into an atmosphere composed solely of the reactive gas. The reaction between the liquid and the gas commences as soon as the droplets start to fall, downstream of the distribution element 20. It is limited by the heating of the liquid resulting from the absorption reaction for as long as the latter is not cooled in contact with the spiral plates 12.

The utilization of a porous material to constitute the distribution element 20 may seek to reduce significantly the speed of the first fluid F1 ejected from the second chamber 24, which encourages an effect of coalescence of the downstream flow into a single thread. Since this is in conflict with the desired objective of homogeneous distribution, the system may comprise an anti-coalescence device 34 configured in order to oppose the effect of coalescence of the first fluid F1 ejected at the outlet surface of the distribution element 20, under the wall 26. The anti-coalescence device 34 possesses support elements in contact with or in the immediate proximity of (the distance being required to be less than 0.5 mm) the outlet surface at different locations of the outlet surface. Each support element may be formed by an upper edge of a wall, the walls constituting the anti-coalescence device 34 being connected to one another so as to form a complex structure, for example a honeycomb, arranged between the outlet of the distribution element 20 and the inlet zone 15 of the first channel 13. The complex structure is advantageously arranged directly at the outlet, potentially in contact, from the outlet surface of the element 20. When the droplets formed by the anti-coalescence device 34 arrive in the zone 15, they normally form a flowing film on the plate 12, by capillary action. The honeycomb structure is only one example among a multitude of possible geometries. When viewed from above, it is possible to have a geometry consisting of grids, lozenges, triangles, spirals, tangent circles, etc.

The forces due to capillarity (or to surface tensions) tend to create a horizontal flow on the lower face of the distribution element 20, which is counter-productive as regards a homogeneous surface distribution. The proposed geometry permits this horizontal flow to be limited by exploiting these same forces of capillarity along vertical walls of the anti-coalescence device 34 as far as their lower extremity. At this extreme point, the horizontal propagation is strongly discouraged by the fineness of the walls. The formation of drops then takes place on the entire length of the lower edge exhibited by the walls. These drops are detached by gravity and form a rain having a constant surface density on the section in question in the form of a crown. The advantage of this structure is thus to homogenize the flow. The sensitivity of the exchanger to the verticality is significantly lower than for a system of tubes and vessels. One possible variant is to provide for the element 34 not to be flat on its lower surface, for example by creating a saw-tooth profile. This then imparts a robustness to the device 34 in the event of a lack of verticality, and the horizontal coalescence is less as a result.

The admissible pressure drop in the flow of the first flow F1, in the case of a liquid, is not a particularly limiting factor to the extent that the liquid originates from the high-pressure part of the circuit before passing via a throttling valve and before entering the absorber functioning at the low-pressure level. These levels of pressure depend on the pairing of fluids F1, F2 and on the temperatures of the secondary circuits, the distance between the two levels being in the order of several bars for the systems operating above atmospheric pressure.

The separating wall 26 of annular shape is illustrated in FIG. 4. The distribution element 20 forms an external part of the wall 26 (illustrated by a shaded area), the remaining part on the internal side of the ring being formed by an element 33 sealing against any flow of fluid F1 (non-shaded area). At its centre, this internal sealing element 33 delimits a passage for the putting into place of the tubular element 27 that is utilized for the constitution of the supply device 21.

In particular, the outlet of the supply device 21 for a second fluid F2 may be housed in the first chamber 23. The supply device 21 includes a tubular flow element 27 for the second fluid F2 passing through the second chamber 24, passing through the separating wall 26 and having a blind end part housed in the first chamber 23. The walls of the blind part situated in the first chamber 23 are provided with radial holes (first embodiment in FIG. 2) or with a plurality of radial drillings 29 (second embodiment in FIG. 3) which constitute the outlet of the supply device 21.

Figure 2:
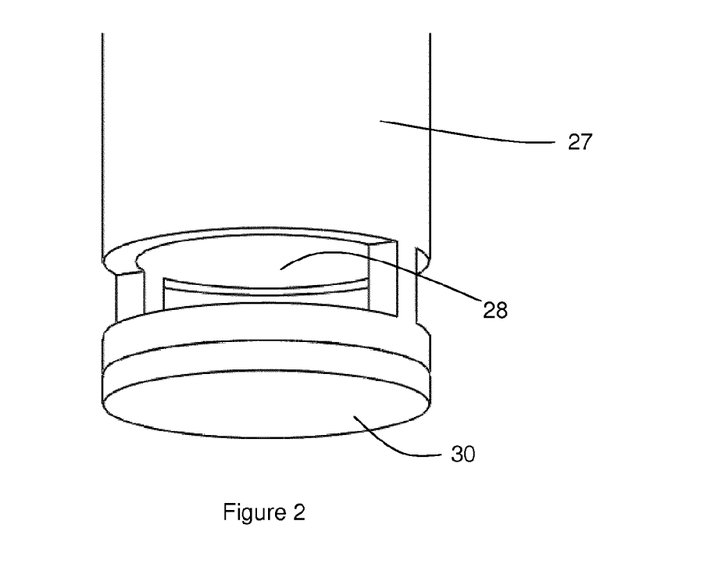
FIGS. 2 and 3 are perspective views of two embodiments of a supply device for a second fluid.

In the first embodiment with reference to FIG. 2, the second fluid F2 circulates in a descending flow which is caused to break up in all directions perpendicular to the descending axis X when it is forced to circulate in the radial holes 28 arranged laterally to the tubular element 27. The geometry of these holes is dimensioned in order to obtain the best possible compromise between the following factors:
  limitation of the ensuing losses of pressure,
  limitation of disruptions in the flow of the liquid droplets of the first fluid F1,
  homogeneity of revolution about the axis X,
  ease of industrial production.

Figure 3:
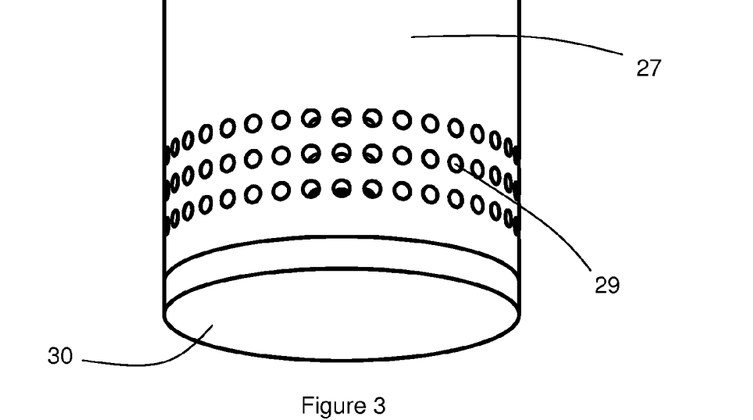

In the second embodiment with reference to FIG. 3, the multitude of radial drillings 29 is provided on the periphery of the tubular element 27 in proximity to the extremity that is blanked off by a stopper 30. With a dimensioning of the drillings selected in order to ensure a uniform radial distribution of the flow of fluid F2. For example, the drillings 29 may be distributed in the form of a network arranged regularly along lines defining the perimeters of the tubular element. This geometry exhibits the advantage of good homogeneity of the flow for 360 degrees about the axis, with the exception of the weak effects due to the discretization of the open surface. This geometry creates a stable flow, and it is possible to achieve dimensioning with the help of known correlations without having to resort to a simulation. It is a matter, in particular, of limiting the pressure drop generated by this device. Such an outlet may be assembled on the basis of known industrial products, which is advantageous.

In the variant equipped with a nozzle 22, the fluid F2 arrives in the distribution zone via a lateral entrance 31 that is extended as far as the centre of the vessel, under the liquid jet, and into the central zone of the jet, where a hole 28 in the tubular element 27 permits the release of the fluid F2 into the first supply housing 19 without a separating wall 26. The hole 28 may be similar to those described above or may be replaced by a multitude of drillings 29. The third fluid F3 is supplied via a lateral entrance 32 situated beneath that of the second fluid F2 and passes through the distribution zone in a sealed manner before proceeding to supply the internal vessel 17.

The advantages of the arrangement of FIG. 6 are:
  the flow of the second fluid F2 disrupts the flow of first fluid F1 in a deterministic manner: it is thus possible to dimension the nozzle 22 and the orifice accordingly,
  the relative orientation of the flows of the first and second fluids makes it possible to compensate for the curvature of the trajectories through the effect of gravity,
  the pressure drop in the second fluid F2 is low,
  annular wetting is possible, which is perfectly adapted to the geometry of the exchangers 11 with a spiral plate 12,
  the absorption reaction may already be initiated in the first supply housing 19, it is unlikely that the central zone will be wetted since the second fluid F2 exerts a thrust radially towards the exterior about the axis X: this prevents choking of the interior of the spiral, the arrangement for the alignment of the inlets 31 and 32 makes it possible to minimize the masking effect on the flow of the first ejected fluid F1: a reduction in the section at the inlet 31 may be implemented for the same purpose.

The spiral plate 12 of the exchanger 11 is coiled so as to delimit, in addition to the first channel, the second fluid flow channel mentioned above, in particular in the form of a spiral. The second channel discharges onto a second axial extremity (not illustrated) of the exchanger 11, opposite the first axial extremity 14. In the vertical arrangement of the exchanger 11, the second axial extremity corresponds to the lower extremity. The system, in particular the exchanger 11, comprises the second supply housing (not illustrated) arranged so as to extend the exchanger 11 axially at its second axial extremity. This second housing is used to supply or to evacuate (depending on the direction of circulation of the third fluid with respect to that of the two other fluids) the second channel with a third cooling fluid F3, circulating respectively in a cross-flow with the first fluid. This makes it possible to achieve a thermal exchange, in particular by means of the plate 12, with the first fluid F1 and/or the second fluid F2 circulating in the said at least one first channel 13.

One application of the system is preferably, although not exclusively, to be able to produce an absorber for a thermodynamic absorption machine on the basis of this existing geometry of a exchanger 11 with a spiral plate 12, in particular for:

thermodynamic absorption machines operating with pairings of first and second fluids such as, for example, the ammonia/water and lithium bromide/water pairings, and/or a washing tower: a washing tower involves causing a gas (second fluid F2) to circulate, in a countercurrent, under a fine rain of liquid reagent (first fluid F1). The fineness of the droplets of liquid increases the reaction surface.

and/or all the applications where a flowing film is utilized in order to encourage transfers of mass between two fluids, and/or all the applications for double homogeneous distribution of gas and liquid in channels 13 that are common to the two flows.

In particular, the invention relates to an absorption refrigeration machine, in which the second fluid F2 is absorbed by the first fluid F1 in the area of an absorber constituted by a system corresponding to the previous description. The machine may thus comprise, in addition, a solar thermal system taking solar energy as its input in order to dissociate the first and second fluids F1, F2 upstream of such an absorber thus constituted. As a result, the thermodynamic machine then utilizes the system in such a way that the first and second fluids F1 and F2 are configured such that the second fluid F2 is at least partially absorbed by the first fluid F1 during the flow in the said at least one first fluid flow channel 13 of spiral shape, in order to constitute this absorber of a thermodynamic machine for solar refrigeration by absorption. In particular, the first fluid F1 may be a solution of ammonia/water, a solution of lithium bromide/water or a solution of lithium chloride/water, and the second fluid F2 may be ammonia or water.

The phenomenon of absorption is specific and difficult to understand since it combines a flow with a transfer of mass, a change in phase and a thermal exchange, all of these phenomena being interlinked with regard to the travelling speeds. The present invention describes an innovative solution intended to support the divers physical phenomena taking place in an absorber thus constituted.

In the preceding description, the spray nozzle 22 of the second embodiment and the distribution element 20 of the first embodiment address one and the same problem, namely the management of the supply to the inlet zone of the exchanger. These two embodiments provide an identical result, namely a homogeneous supply to the entire surface of the inlet zone of the exchanger. The functions are identical by influencing the manner of distributing the first fluid thanks to the distribution device.

The invention claimed is:

1. System comprising:
an exchanger with a spiral plate coiled around a principal axis of the exchanger, so as to delimit a first fluid flow channel having a cross section in the form of a spiral discharging at a first axial extremity of the exchanger at an inlet zone of which the overall size is contained within a first crown, and
a distribution device configured in order to supply the whole of the surface of the first crown in a homogeneous manner with at least a first fluid,
wherein the distribution device comprises a spray nozzle for the first fluid configured so as to form, at an outlet of the spray nozzle, a jet of the first fluid of conical shape, being hollow at the centre of the cone, oriented in the principal axis of the exchanger, and so that the jet exhibits, at the inlet zone of the first fluid flow channel, a shape of a second crown having dimensions equal to the dimensions of the first crown of the inlet zone.

2. System according to claim 1, wherein the distribution device comprises an outlet at which the first fluid is ejected uniformly from the distribution device and is arranged at a distance from the inlet zone in the principal axis of the exchanger.

3. System according to claim 1, comprising a supply device arranged above the first axial extremity of the exchanger and configured in order to supply the inlet zone of the first fluid flow channel with a second fluid in addition to the first fluid.

4. System according to claim 3, wherein the supply device comprises an outlet at which the second fluid exits from the supply device and is arranged at a distance from the inlet zone in the principal axis of the exchanger.

5. System according to claim 4, wherein the outlet of the supply device for the second fluid is situated, in the principal axis of the exchanger, between the inlet zone of the first fluid flow channel and the distribution device for the first fluid.

6. System according to claim 4, wherein the outlet of the supply device is configured so that the second fluid is ejected uniformly at the outlet so that a flow formed by the second fluid exiting from the supply device meets the first fluid before reaching the inlet zone.

7. System according to claim 6, wherein the outlet of the supply device for the second fluid is configured so that the second fluid is ejected perpendicularly to the principal axis of the exchanger.

8. System according to claim 4, wherein the outlet of the supply device for the second fluid is housed in the first chamber of a first supply housing extending the exchanger axially at a first axial extremity of the exchanger and comprising:
a first chamber communicating with the inlet zone of the first fluid flow channel, a second chamber arranged axially on a side opposite the exchanger with respect to the first chamber and equipped with an inlet for a first fluid and configured so as to be filled by the first fluid, a separating wall between the first and second chambers, the separating wall being at least partially constituted by the said distribution element so as to ensure a uniform outflow of the first fluid from the second chamber towards the first chamber.

9. System according to claim 8, wherein the supply device for a second fluid includes a tubular flow element for the second fluid passing through the second chamber, passing through the separating wall and having a blind part housed in the first chamber, the walls of the blind part being provided with radial holes or radial drillings forming an integral part of the outlet of the supply device.

10. System according to claim 1, wherein at least one of the spiral plate exchanger and the distribution device is configured so that the first fluid ejected from the distribution device forms a film flowing along the first fluid flow channel.

11. System according to claim 10, wherein the first fluid flow channel is configured so that, in the first fluid flow channel, the second fluid circulates along the flowing film of first fluid, in the same direction, and is at least partially absorbed by the first fluid with a transfer of mass from the second fluid towards the first fluid.

12. System according to claim 1, wherein the spiral plate of the exchanger is coiled so as to delimit a second fluid flow channel in a shape of a spiral discharging at a second axial extremity of the exchanger, opposite the first axial extremity, and the system comprises a second supply housing extending the exchanger axially at a second axial extremity of the exchanger and supplying or evacuating the second fluid flow channel with a third cooling fluid circulating respectively in a cross-flow with the first fluid, so as to bring about a thermal exchange with at least one of the first fluid and the second fluid circulating in the first channel.

13. Thermodynamic machine comprising at least a system according to claim 1.

14. Thermodynamic machine according to claim 13, wherein a second fluid is at least partially absorbed by the first fluid at an absorber constituted by the system.

15. Method of implementing an absorber of a thermodynamic machine for refrigeration by solar absorption, comprising:
providing a system according to claim 1,
at least partially absorbing a second fluid by the first fluid during the flow in the at least one first fluid flow channel.

16. System comprising:
an exchanger with a spiral plate coiled around a principal axis of the exchanger, so as to delimit a first fluid flow channel having a cross section in a shape of a spiral discharging at a first axial extremity of the exchanger at an inlet zone of which the overall size is contained within a first crown, and
a distribution device configured in order to supply the whole of the surface of the first crown in a homogeneous manner with at least a first fluid,
wherein the distribution device comprises an outlet at which the first fluid is ejected uniformly from the distribution device and arranged at a distance from the inlet zone in the principal axis of the exchanger, and the outlet of the distribution device is constituted by a distribution element configured so as to be passed through by the first fluid with a pressure drop so that the first fluid is ejected from the distribution element with a uniform surface distribution at an outlet surface of the distribution element, so as to ensure a homogeneous supply of the inlet zone with the first fluid.

17. System according to claim 16, wherein the outlet surface of the distribution element has a shape of a second crown aligned in the principal axis of the exchanger having the shape of the first crown of the inlet zone.

18. System according to claim 17, wherein the second crown formed by the distribution element exhibits dimensions equal to the dimensions of the first crown of the inlet zone.

19. System according to claim 16, wherein the distribution element comprises a self-supporting structure of sintered material formed by an agglomeration of balls.

20. System according to claim 16, wherein the distribution element comprises a stack of metallic screen cloth superimposed in the principal axis.

21. System according to claim 16, comprising an anti-coalescence device configured in order to oppose the effect of coalescence of the first fluid leaving at the outlet surface of the distribution element, the anti-coalescence device having support elements in contact with or in the immediate proximity of the outlet surface.

22. System according to claim 21, wherein each support element is formed by an upper edge of a wall, the constituent walls of the anti-coalescence device being connected to one another so as to form a structure arranged against or in the immediate proximity of the outlet of the distribution element.

23. System according to claim 16, comprising a first supply housing extending the exchanger axially at a first axial extremity of the exchanger, comprising:
a first chamber communicating with the inlet zone of the first fluid flow channel,
a second chamber arranged axially on a side opposite the exchanger with respect to the first chamber and equipped with an inlet for a first fluid and configured so as to be filled by the first fluid,
a separating wall between the first and second chambers, the separating wall being at least partially constituted by the distribution element so as to ensure an even outlet of first fluid from the second chamber towards the first chamber.

24. System according to claim 23, wherein the separating wall is at least partially constituted by the distribution element so as to ensure the even outlet of first fluid from the second chamber towards the first chamber with a regular distribution pattern in a shape of a third crown.

25. System according to claim 16, comprising a supply device arranged above the first axial extremity of the exchanger and configured in order to supply the inlet zone of the first fluid flow channel with a second fluid in addition to the first fluid.

26. System according to claim 25, wherein the supply device comprises an outlet at which the second fluid exits from the supply device and arranged at a distance from the inlet zone in the principal axis of the exchanger.

27. System according to claim 26, wherein the outlet of the supply device for the second fluid is situated, in the principal axis of the exchanger, between the inlet zone of the first fluid flow channel and the distribution device for a first fluid.

28. System according to claim 26, wherein the outlet of the supply device is configured so that the second fluid is ejected uniformly at the outlet so that a flow formed by the second fluid exiting from the supply device meets the first fluid before reaching the inlet zone.

29. System according to claim 28, wherein the outlet of the supply device for the second fluid is configured so that the second fluid is ejected perpendicularly to the principal axis of the exchanger.

30. System according to claim 26, comprising a first supply housing extending the exchanger axially at a first axial extremity of the exchanger, comprising:
a first chamber communicating with the inlet zone of the first fluid flow channel,
a second chamber arranged axially on a side opposite the exchanger with respect to the first chamber and equipped with an inlet for a first fluid and configured so as to be filled by the first fluid,
a separating wall between the first and second chambers, the separating wall being at least partially constituted by the said distribution element so as to ensure an even outlet of first fluid from the second chamber towards the first chamber,
wherein the outlet of the supply device for the second fluid is housed in the first chamber.

31. System according to claim 30, wherein the supply device for the second fluid includes a tubular flow element for the second fluid passing through the second chamber, passing through the separating wall and having a blind part housed in the first chamber, the walls of the said part being provided with radial holes or with radial drillings forming an integral part of the outlet of the supply device.

32. System according to claim 30, wherein the separating wall is at least partially constituted by the distribution element so as to ensure the even outlet of first fluid from the second chamber towards the first chamber with a regular distribution pattern in the shape of a fourth crown.

33. System according to claim 16, wherein at least one of the spiral plate exchanger and the distribution device is configured so that the first fluid ejected from the distribution device forms a film flowing along the first fluid flow channel.

34. System according to claim 33, wherein the first fluid flow channel is configured so that, in the first fluid flow channel, the second fluid circulates along the flowing film of first fluid, in the same direction, and is at least partially absorbed by the first fluid with a transfer of mass from the second fluid towards the first fluid.

35. System according to claim 16, wherein the spiral plate of the exchanger is coiled so as to delimit a second fluid flow channel in a shape of a spiral discharging at a second axial extremity of the exchanger, opposite the first axial extremity, and the system comprises a second supply housing extending the exchanger axially at a second axial extremity of the exchanger and supplying or evacuating the second fluid flow channel with a third cooling fluid circulating respectively in a cross-flow with the first fluid, so as to bring about a thermal exchange with at least one of the first fluid and the second fluid circulating in the first channel.

* * * * *